3,632,734
REDUCTION OF SPRINGBACK IN PARTICLE-
BOARD BY RESIN TREATMENT OF GREEN
PARTICLES
John G. Haygreen, Roseville, Minn., assignor to The
Regents of the University of Minnesota, Minneapolis,
Minn.
No Drawing. Filed July 28, 1969, Ser. No. 845,507
Int. Cl. B29j 5/02
U.S. Cl. 264—122    5 Claims

ABSTRACT OF THE DISCLOSURE

A method for reducing springback (irreversible swelling) in particle-board made from wood particles by using green wood particles (instead of dried particles), applying an impregnating heat settable (phenol formaldehyde) resin to the green particles, then drying under conditions which will not cure the resin, applying a bonding heat settable (phenol formaldehyde) resin and heating under pressure to compress the board and cure the resins. Springback is materially reduced. The board has greater strength retention and greater stiffness. It is less hygroscopic.

---

This invention is directed to a method for reducing springback (irreversible swelling) in particle-board by resin treatment of green particles prior to pressing into board. Springback occurs when a particle-board is alternately wetted and dried. Wetting may occur either through contact with liquid water or by subjecting the particle-board to high humidity. Springback is one of the greatest deterrents to the use of particle-board in exterior construction where high equilibrium moisture content conditions exist.

There have been many attempts to develop methods of effectively stabilizing particle-board from dimensional changes resulting from moisture uptake. Swelling of particle-board is in part reversible (normal swelling and shrinkage) and in part irreversible (springback). The springback portion is a much more serious problem because of both its magnitude and permanence.

Particle-board is made by spraying dry wood particles, chips or flakes, with a heat-curing adhesive. Phenol formaldehyde resins, partially polymerized to reduce diffusion into the wood, are generally used for boards for exterior application. The boards are pressed under high pressure and temperature. This brings the particles into intimate contact and cures the resin. The resulting boards generally have a density higher than that of the original wood. This results from the large extent of crushing inherent in the process.

The present commercial attempts at keeping springback to a minimum are based primarily upon using a greater amount of adhesive (6 to 10% solids by weight) than is actually necessary for adequate bonding (4 to 6%). The adhesives used are partially polymerized resins formulated for adhesive bonds rather than impregnation and are applied to dry particles (2 to 6% moisture content).

Other methods of increasing stabilization and reducing springback are reported in the literature but have not been adopted commercially because of cost or limited effectiveness. These methods include: (1) treating with high temperatures after manufacture; (2) treating with high temperature saturated steam after manufacturer; (3) acetylation of dry particles prior to pressing; (4) impregnation of particles with polyethylene glycol prior to pressing; and (5) addition of phenol formaldehyde impregnating resins to dry particles prior to pressing.

Several different approaches to this last method have been tried. According to one such approach, phenol formaldehyde impregnating resin has been sprayed on dry particles at rates of 4% and 8% solids. Boards were then made with no additional bonding resins being added. It was found that these boards performed no better than conventionally produced boards.

According to another approach, particles were treated at levels of 10, 20 and 30% phenol solids. The particles were dried, a 5% phenol formaldehyde bonding resin was applied and the particles were pressed into boards. Boards made with untreated particles by this method were found to perform as well as boards made with the treated particles, based on strength tests run after accelerated aging had been completed.

According to a still further approach, dry particles were treated with ammonia, pressure impregnated with a solution of phenol and formaldehyde and steamed to obtain a partial cure prior to pressing. A 10% resin impregnation was obtained. A phenol formaldehyde bonding resin in the amount of 7% was then used. The particles impregnated in this manner reduced irreversible swell by 60% and reversible swell to 30 to 40%.

In another experiment, dry particles were sprayed with phenol formaldehyde impregnating resin to a level of 25% resin solids based on the oven dry weight of the flakes. The flakes were dried to 6% moisture content, removing the water added during spraying. Then 4% of phenol formaldehyde bonding resin solids was sprayed on the particles and the board was pressed. This treatment was found to eliminate springback and significantly reduced reversible swell. This effective stabilization, however, is what might be expected from the high (25%) amount of resin added.

In all these previous approaches to the reduction of springback based on the addition of phenol formaldehyde impregnating resins, as described above, the resin was applied to dry particles. In the first two approaches described, no beneficial results were obtained from the phenol formaldehyde impregnating resins. Beneficial results (springback reduced 60%) were obtained when the dry particles were treated with resin at a level of 10% of the weight of the board. Treatment with 25% phenol formaldehyde resin by weight was found to be very effective. However, this high level of resin use is not commercially practical because of the cost and weight of the final product.

It has now been discovered that significant reduction in springback in particle-board can be obtained by applying small amounts of phenol formaldehyde impregnating type resins to green particles, instead of dried particles. The impregnating resin diffuses into the wood structure in such a manner that when the wood is compressed under heat and the resin is cured, there is a very significant improvement in the springback characteristics of the product. It is necessary that the pretreatment be applied to green material, not to dried chips or particles. The diffusion of the resin into the wood is most effective in this green condition.

Broadly stated, the manufacture of particle-board according to the present invention includes the following major steps:

(1) Green particles are produced.
(2) Green particles are sprayed with phenol formaldehyde impregnating resin at a low level (about 4 to 8%) of resin solids content.
(3) After a short storage period, the particles are dried at a low temperature avoiding pre-cure.
(4) Phenol formaldehyde bonding resin is sprayed on the pretreated green particles at a level (about 4 to 6%) normally used in the manufacture of particle-board.
(5) The board is pressed at about 300 to 350 degrees F.

The process differs from present commercial practice in steps 2 and 3. In current commercial practice, step 2 is not included and while drying is carried out, this is of untreated green particles and is at a higher temperature in step 3 above.

The green particles are produced in commercial apparatus in accord with conventional industry practices. A number of different types of flakers and refiners are commercially available and any of these may be used.

The phenol formaldehyde impregnating resin must be one having a low degree of polymerization since this contributes to diffusion into the wood. Such resins are commercially available from a number of manufacturers. One typical phenol formaldehyde impregnating resin which may be used is sold under the name "Tybon 951" by its manufacturer, Pacific Resins and Chemicals, Inc. The resin is low-advanced so that the monomer size is small. The solids content is 62%. The pH is 7.2. It is infinitely dilutable in water.

In contrast, the phenol formaldehyde bonding resin has a fairly high degree of polymerization so that diffusion is minimized. A large number of such bonding resins are commercially available from a number of manufacturers and are presently in use both in the manufacture of plywood and particle-board. One typical phenol formaldehyde bonding resin which may be used is sold under the designation "HL-69" by Borden Chemical Company. This is a partially polymerized resin of 50% solids content. The pH is 12. It has infinite water dilutability. It is a fairly slow reacting resin presently sold for use in the manufacture of plywood and particle-board.

The pretreated green particles are dried to about 2 to 6% moisture content without effecting pre-cure of the impregnating resin. Drying times and temperatures can vary widely depending primarily upon the reactivity of the particular resin used. Reactivity of the resin is affected to some extent by the pH of the wood. Drying may occur over long periods of time under low temperature conditions or extremely short drying times of 1 to 3 minutes in high temperature dryers with inlet temperatures of 1000 degrees to 1800 degrees F. without causing pre-cure in most instances so long as the particle temperature is below about 250 degrees F.

Pressing time varies with board thickness and resin system used. Typically the press time may be from about 6 to 20 minutes. The press cycle is similar to that presently used commercially. Enough pressure between about 400 to 700 p.s.i. (typically about 500 p.s.i.) is initially applied to close the press to stops in about 50 seconds. The constant thickness is held until the end of the pressing time. Preferably a short decompression period is used prior to opening the press.

A large number of particle-boards of three types were manufactured and studied. In each instance the sapwood portion of aspen pulpwood bolts were run through a pulp chipper. The chips were then hammer-milled to reduce the width dimension of the particles. These particles were then run twice through a Sprout-Waldron single disc refiner equipped with spike-tooth plates. This produced a wide range of particle sizes of a type commonly used in particle-board. The fines and coarse material were both incorporated in the board. This makes a stronger board than either the fine or coarse material alone.

The particles to be impregnated were sprayed in green condition with the phenolic impregnating resin uniformly applied from aqueous solution in finely atomized droplets. The impregnated particles were stored twelve hours in closed containers and then were spread on screens and dried at room temperature to about 6% moisture content. Those particles used to manufacture control particle-boards according to prior art processes, were spread on screens and dried immediately after refining without impregnation with resin. The bonding resin was applied to the dry particles in a blender designed to maximize resin efficiency. The particles were formed into mats and cold pressed prior to hot pressing.

All boards were of the same particle type and were pressed to 50 pounds per cubic foot density. The finished boards were made in half-inch thicknesses. About 500 p.s.i. was initially applied to close the press in about 50 seconds. The constant thickness was held for about 14 minutes. A short decompression period was used prior to opening the press. The press temperature was between 300 and 350 degrees F. Comparison of dimensional properties and some physical properties of particle-boards produced using standard processes are compared with particle-boards produced according to the process of the present invention in the following table.

| | Board Type | | |
|---|---|---|---|
| | Commercial, type exterior board | Commercial, type high resin exterior board | Present invention |
| Percent [1] of impregnating resin | 0 | 0 | 6 |
| Percent [1] of bonding resin | 6 | 11 | 6 |
| Percent of springback after 3 hr. boiling and oven drying | 20 | 12 | 2 |
| Percent of swelling after 3 hr. boiling | 34 | 24 | 12 |
| Percent of springback after 90% relative humidity equalization and oven drying | 9 | 8 | 1 |
| Percent of swelling after 90% relative humidity equalization | 20 | 17 | 9 |
| Modulus of rupture (MOR) (p.s.i.) | 3,200 | 4,450 | 4,430 |
| Modulus of elasticity (MOE) (p.s.i.) | $4.7 \times 10^5$ | $5.7 \times 10^5$ | $6.8 \times 10^5$ |
| Equilibrium moisture content at 50% relative humidity (percent M.C.) | 6.4 | 6.2 | 5.0 |

[1] Based on oven-dry weight of the board and the weight of resin solids.

The effectiveness of the process according to the present invention is very pronounced. Springback is reduced by about 90% from that of a normal commercial board and about 85% from that of a board produced with a high content of bonding resins. The total resin content of the second board is almost equal to that of the board made with impregnating resins. The strength retention after boiling of boards made according to the present invention is obviously far superior to that of either of the other two boards.

The board made according to the present invention has about the same bending strength (MOR) as the high resin level commercial type board. It has a great deal greater stiffness (MOE), however. The board made by the new process is also less hygroscopic than either board made along present commercial lines. This is indicated by the lower equilibrium moisture content at the 50% relative humidity condition.

The results demonstrate the effectiveness of a small amount of phenol formaldehyde impregnating resins applied to green flakes in improving the dimensional properties of exterior particle-boards.

The embodiments of the invention in which an exclusive property or privilege is claimed are defined as follows:

1. A method for producing particle-board characterized by materially reduced springback, said method comprising:
   (A) producing green wood particles,
   (B) applying a water dispersible heat settable phenol formaldehyde impregnating resin having a low degree of polymerization to said green particles at a low level of resin solids content between about 4% to about 8% based upon the dry weight of the food,
   (C) drying the thus treated green particles under temperature conditions avoiding pre-cure of the resin,
   (D) a water dispersible heat settable phenol formaldehyde bonding resin having a high degree of polymerization to said dried particles at a level of resins solids content between about 4% to about 8% based upon the dry weight of the wood, (E) forming the particles into a mat and subjecting to heat and pressure to compress and densify the mat into a board and cure the resins.

2. A method according to claim 1 further characterized in that said particles are dried at a particle temperature below about 250 degrees F.

3. A method according to claim 1 further characterized in that said mat of resin treated particles is subjected to initial pressure of about 500 p.s.i., heated at between about 300 and 350 degrees F. and maintained at constant thickness.

4. A method for producing particle-board characterized by materially reduced springback which comprises:

(A) producing green wood particles,
(B) applying a water dispersible phenol formaldehyde impregnating resin having a low degree of polymerization to said green particles to a level of about 4% to about 8% resin solids content based upon the dry weight of the wood,
(C) drying the thusly treated green particles at a particle temperature below about 250 degrees F. to avoid curing of the resin,
(D) applying a water dispersible phenol formaldehyde bonding resin having a high degree of polymerization to said dried particles to a level of about 4% to about 6% resin solids content based upon the dry weight of the wood,
(E) forming the particles into a mat and subjecting to heat between about 300 degrees F. to about 350 degrees F. and pressure to compress and densify the mat into a board and cure the resins.

5. A method according to claim 4 further characterized in that said mat of particles is subjected to initial pressure between about 400 and 700 p.s.i. and heated for about 6 to 20 minutes while maintained at constant thickness.

References Cited

UNITED STATES PATENTS

| | | | |
|---|---|---|---|
| 3,287,479 | 11/1966 | Navdain | 264—109 |
| 3,267,188 | 8/1966 | Bassett et al. | 264—109 |

ROBERT F. WHITE, Primary Examiner

J. R. HALL, Assistant Examiner

U.S. Cl. X.R.

264—126